UNITED STATES PATENT OFFICE.

JOHANN GUIDO WOLF, OF GRAZ, AUSTRIA-HUNGARY.

FIRE AND WATER PROOF ROOF-COVERING.

SPECIFICATION forming part of Letters Patent No. 423,583, dated March 18, 1890.

Application filed June 22, 1889. Serial No. 315,225. (No specimens.)

*To all whom it may concern:*

Be it known that I, JOHANN GUIDO WOLF, a subject of the Emperor of Austria, residing at Graz, in the Empire of Austria-Hungary, have invented certain new and useful Improvements in Fire and Water Proof Materials; and I do hereby declare that the following is a full, clear, and exact description of the invention, which will enable others skilled in the art to which it appertains to make and use the same.

The object of my invention is to obtain a plastic material which is both fire and water proof and may be readily and cheaply produced, and which is adapted for use as a roofing material or for isolation in structures which are intended to be fire-proof, or for other like uses.

From waste pieces of wood—such as shavings, sawdust, and chips—I produce by mixing with them burnt magnesite and chlorate of magnesium a new material which can be used as a means of uniting different objects, or as a plastic substance applicable to various purposes, and which affords a harder or softer material, according to the combination. This mass is especially adapted, for example, to the manufacture of fire-proof and weather-proof roofing material, railway-ties, insulating material, &c. To produce this material, which, owing to its principal ingredient, is essentially a wood mass, and which, owing to its stone-like appearance, I have named "Ossalith," I proceed as follows: The burnt magnesite and chlorate of magnesium are mixed, forming a thin fluid mass, to which the wood in small particles (dry soft wood is the best) is added in quantities which will be mentioned later. The stiffened mush which results after some mixing is then exposed in a moderately-heated place to a drying process, which is continued about twelve hours. It is then molded in the desired form and rapidly dried. While the soft mass is being molded it is advisable to agitate the mold vigorously, so that the heavier particles will settle well against the wall of the mold and set, and thus assume completely the shape and smoothness of the mold. The molded product thus obtained will have a smooth almost polished surface.

A medium hard and very good combination of the above-mentioned materials is about as follows: Twenty-four parts, by weight, of burnt magnesite; thirty parts, by weight, of fine wood, (sawdust, for instance;) forty-six parts, by weight, of fifteen to twenty per cent. chlorate-magnesium lye. This mixture can be pressed into molds very nicely. Should a softer mass be desired, the woody material must be added in greater quantities, and, on the other hand, less wood should be used for a harder mass, so that the hardness of the product can be easily modified, as desired.

Magnesite, as well as chlorate of magnesium, are generally found impure in trade, and may be used in this condition, except that the impurity, consisting of carbonate of lime, should not exceed about fifteen per cent.

Other substances—such as coloring-matter—may be added to the above-named materials, if the purpose which the product is to subserve requires it; but these substances, which are mere additions, are no part of the invention.

The material produced is lighter or heavier, according to its degree of hardness, yet in all cases it is easy to work. For example, it is as easy to drive nails through roofing-tiles made of ossalith as through wood.

The softer combinations are more porous than the harder ones, and are by virtue of their porosity applicable in cases where this is demanded—for example, in diaphragms for electrical cells, indicators for testing the humidity of the atmosphere, &c.

The examples which have been given show the diversified applicability of this material. Its usefulness is also augmented by the fact that articles made from it can be reunited by the same material, if by chance they are broken.

A material suitable for some purposes may be obtained without the finishing step of drying or hardening in shaking forms or molds; but where the product in its best form is desired this last step in the process is to be employed.

Having thus described my invention, what I claim as new, and desire to secure by Letters Patent, is—

The herein-described fire and water proof material, composed of fine particles of woody material, burnt magnesite, and chlorate of magnesium, in substantially the proportions stated, mixed and dried, substantially as and for the purposes specified.

In witness whereof I have hereunto set my hand in presence of two witnesses.

JOHANN GUIDO WOLF.

Witnesses:
PAUL FISCHER,
B. ROI.